Dec. 25, 1962

W. SOMMER 3,070,413

ANTI-FRICTION BEARING ARRANGEMENT FOR BOTTOM ROLLS

Filed Feb. 9, 1960

INVENTOR

Walter Sommer

By Richard Ernst
Ag't

United States Patent Office 3,070,413
Patented Dec. 25, 1962

3,070,413
ANTI-FRICTION BEARING ARRANGEMENT FOR BOTTOM ROLLS
Walter Sommer, Leonberg, Wurttemberg, Germany, assignor to SKF Kugellagerfabriken Gesellschaft mit beschränkter Haftung, Schweinfurt, Bavaria, Germany
Filed Feb. 9, 1960, Ser. No. 7,611
Claims priority, application Germany Feb. 12, 1959
6 Claims. (Cl. 308—187.1)

The present invention relates to antifriction bearings, and more particularly to an antifriction bearing arrangement for the bottom rolls in a drafting mechanism on textile spinning machines.

Plain sleeve bearings are still commonly employed for rotatably supporting the bottom rolls of drafting mechanisms although it is relatively costly to maintain them in proper working condition, and although they cannot satisfactorily sustain high bearing pressures. Roller bearings or other anti-friction bearings are far superior in these respects, but they require maintenance of close dimensional tolerances within the bearing arrangement as well as of a tight seal against contamination of the bearing by particles of the material which is being spun.

It has also been found difficult to keep the antifriction elements of a sealed bearing adequately lubricated. Upon heating of a lubricant-packed bearing during operation, the lubricant is forced out of the bearing by its own expansion and by centrifugal forces. It has so far not been practical to replace or replenish the lost lubricant as frequently as necessary. Operating with an inherently insufficient amount of lubricant, the bearing is subject to relatively rapid wear which results not only in high bearing replacement costs, but also increases the overall power consumption of the spinning machine to a significant extent.

It is an object of the present invention to provide a bearing arrangement for the bottom rolls of a textile drafting mechanism which is capable of sustaining the high bearing pressures resulting from the drafting practices which are preferred at this time.

Another object is the provision of such a bearing arrangement which is reliably sealed against contamination by solid particles present in the area surrounding the bearing arrangement.

A further object is the provision of an arrangement which reduces lubricant losses from the bearing as compared to known arrangements, and which permits convenient replenishment of lubricant.

Yet another object is the provision of a bearing arrangement which secures the bottom rolls in their operating postion in a simple manner and permits ready access to the several elements of the bearing.

Generally, the invention aims at an antifriction bearing of the type described capable of prolonged operation without maintenance under adverse environmental conditions.

With these and other objects in view, the invention provides an inner bearing ring which may be integral with a bottom roll, and which defines an annular bearing space with a coaxial outer bearing ring. The inner bearing ring is rotatably supported in the outer bearing ring by means of interposed antifriction elements, such as axially elongated rollers, which make rolling contact with the bearing rings during relative rotation thereof. This bearing arrangement is sealed by means of an annular extension member which axially projects from one of the rings and is coaxial therewith. The other ring is formed with an axially open annular recess which movably receives the extension member in sealing engagement.

According to an additional feature of the invention, the recess which receives the annular extension member is provided in a separate sealing member mounted on the other ring, and preferably made of resiliently deformable material to facilitate access to the bearing elements, and assembly and disassembly thereof. Such a resilient sealing member may be secured by its own elastic force to the ring on which it is mounted. For this purpose, the sealing member is advantageously provided with an integral radially projecting bead portion engaging a mating circumferential groove on the other ring. Preferably, the sealing member is mounted on the ring which is integral with or fixedly mounted on the roll itself, whereas the extension member is mounted on, or integral with the outer sealing ring which in turn is carried by a bearing bracket or another stationary support element of the spinning machine.

Other features and many of the attendant advantages of this invention will be readily appreciated as the same becomes better understood by reference to the following detailed description when considered in connection with the accompanying drawings in which like reference numerals designate like parts throughout the figures thereof, and wherein.

Figure 1:
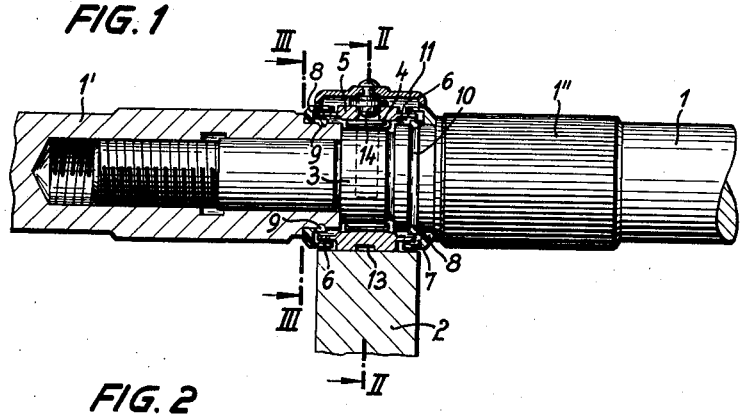
FIG. 1 shows a front elevational, partly in section, of a preferred embodiment of the bearing arrangement of this invention.
Figure 2:
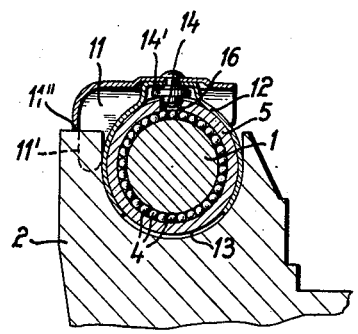
FIG. 2 is a sectional side elevation of the apparatus of FIG. 1, the section being taken on line II—II.
Figure 3:
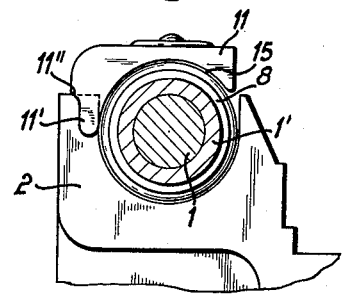
FIG. 3 is a side elevational view of the apparatus of FIG. 1, taken in section on line III—III.

Referring now to the drawings in detail, and initially to FIGS. 1 to 4, there is shown a twin bottom roll of a textile drafting mechanism assembled in a well known manner, and having a section 1 that has an integral axial extension which engages a mating axial recess in a second section 1' and is threadedly secured therein. Each section is provided with a knurled cylindrical working face 1''. The assembly is mounted in a recess of the bearing bracket 2.

An axial portion of the roll section 1 between the two working faces has a smooth cylindrical surface which constitutes the inner ring 3 of a roller bearing, the rollers 4 of which are contained within an outer bearing ring 5. The inner surface of the ring 5 deviates from a purely cylindrical shape by a slight axial convex curvature, when viewed toward that inner surface. Such axial curvature of the outer ring 5 makes alignment of the bearing rings less critical than would be the case with two cylindrical ring faces.

The axial end portions 6 of the outer bearing ring 5 are of reduced radial thickness and constitute annual extension members which are coaxial with the ring 5 and axially project therefrom. Each extension member 6 engages an annular axial recess 7 in an annular sealing member 8 of U-shaped cross section. The sealing members 8 are made of resilient material, such as lubricant-resisting synthetic rubber, and each is mounted on one of the bottom roll sections 1, 1'. They are held in place on the respective section by an integral bead 9 which radially projects from the inner leg of the U-shape and engages a mating circular groove 10 of the roll section. In the relaxed condition, the internal diameter of the sealing member 8 is smaller than the external diameter of the corresponding roll portion so that the sealing member is firmly held in place by its own elastic force. If the sealing member 8 is made of relatively stiff rubber, the bead portion 9 is preferably slotted in an axial direction to facilitate mounting of the sealing member 8 on the roll section by merely slipping it over the surface of the roll until the bead 9 drops into the groove 10, and until the bight portion of the sealing member abuts against a shoulder of the roll section.

As best seen from FIG. 1, the external diameter of the sealing member 8 is somewhat greater than that of the knurled faces 1″ of the roll. There is no groove between the working face 1″ and the adjacent sealing member 8 which could collect lint or other solid contaminants from the ambient atmosphere. This arrangement in itself assists in protecting the bearing. The close engagement of the extension members 6 in the recesses 7 of the sealing members 8 additionally provides a relatively long and narrow passage between the interior of the bearing and any outside source of contamination which is not readily traversed by small particles of a fibrous nature, and which also tends to retain a relatively viscous lubricant within the bearing. The outer ring 5 itself is axially co-extensive with the bearing rollers 4. The extension members 6 provide an additional bearing space in which lubricant may be retained so that adequate lubrication is assured for relatively long periods.

Because of the elastic nature of the preferred material for the sealing member 8, any contaminant which may enter the bearing after prolonged operation can be readily removed by folding the outer leg of the U-shape back upon itself, or even upon the adjacent shoulder of the roll section 1, 1′ so that the extension member 6 is exposed for cleaning. More thorough cleaning may require disassembly of the bearing. This is easy enough, but will be rarely called for because of the effective seal between the extension members 6 and the sealing members 8.

Access to the interior bearing elements is facilitated by providing separate extension members 6 releasably mounted on the ring 5 by friction fit instead of making them integral with the ring. This modification may be resorted to if it is desired to make the extension members of a material different from that of the ring 5, for example, a non-metallic material.

Further to improve the sealing of the bearing arrangement, and to secure the axial position of the outer bearing ring 5, there is provided a cover member 11 having the shape of an inverted flat rectangular box. The cover member 11 extends over the open top side of the recess in the bearing bracket 2 in which the bottom roll 1, 1′ is mounted. As best seen from FIG. 2, a spring clip 12 extends from the inside bottom of the cover member 11 into an annular groove 13 in the circumference of the outer bearing ring 5 to secure the axial position of the latter relative to the cover member. The lowest portions of the side walls 11′ of the cover member 11 engage corresponding recesses in the outer surface of the bearing bracket 2, and the front wall 11″ of the cover member 11 rests on the top face of the bearing bracket 2.

The spring clip 12 is mounted on the cover member 11 by means of a riveted pin 14 which has a collar 14′. The collar 14′ rests on the outer surface of the ring 5. The positions of the bearing bracket 2, the outer bearing ring 5, and the cover member 11 relative to each other, and the position of the cover member 11 relative to the sealing member 8 are thus closely determined. The side walls 11′ of the cover member 11 are cut out in such a manner as to conform to the circumference of the sealing members 8, leaving a narrow uniform gap 15 which permits free rotation of the bottom rolls, but interferes with the passage of lint or other solid contaminants.

A portion of the pin 14 which projects longitudinally from the collar 14′ extends into a radial bore 16 of the outer bearing ring 5 and seals the bore. If it is desired to add lubricant to the bearing, the cover member 11 may be manually removed without tools by merely overcoming the spring tension of the clip 12, and lubricant can be introduced through the bore 16. The resilient support provided by the clip 12 for the bearing arrangement of the invention provides a measure of automatic compensation for minor misalignment.

Figure 5:
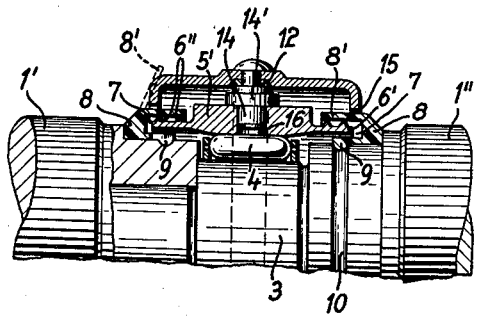
FIG. 5 is a fragmentary front elevational view, partly in section, of a modified embodiment of the bearing arrangement of the invention.
Figure 4:
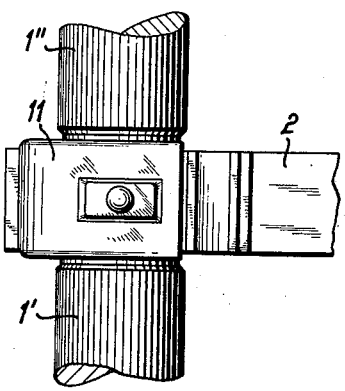
FIG. 4 is a fragmentary plan view of the apparatus of FIG. 1.

The modified embodiment of the invention illustrated in FIG. 5 in a view corresponding to that of FIG. 1, but on an enlarged scale, differs from the device of FIGS. 1 to 4 mainly in details of the seal between the outer bearing ring and the bearing members. The extension members 6′ of the outer sealing ring 5′ are equipped with radially projecting sealing ribs 6″ which extend about the circumference of the extension members and permit a further reduction in the free cross section of the passage between the extension members 6′ and the sealing members 8. While contact between the opposed cylindrical surfaces of the outer sealing ring 5′ or its extension member and the sealing member 8 should be avoided, actual light sealing contact between the very narrow axial faces of the ribs 6″ and the opposite portions of the sealing member 8 will not materially increase the friction within the bearing arrangement. The clearance originally provided between the ribs 6″ and the sealing member 8 thus need not take into consideration the changes in spatial relationship which may be caused by wear or slight misalignment.

FIG. 5 also illustrates at 8′ in dotted outline how the sealing member 8 may be elastically deformed to provide access to the interior of the bearing for inspection, cleaning, or the like.

The bearing arrangement of the invention is quickly assembled from elements each of which can be inexpensively produced to precise tolerances. The elements are assembled with the supporting bracket without the aid of tools or special fastening members. The assembly is largely self-aligning and provides reliable protection against penetration of air-borne solid contaminants. The bearing is capable of holding a reserve amount of lubricant which is prevented from escape from the bearing under the influence of operating heat and centrifugal pressure. Any loss of lubricant can readily be made up.

It should be understood, of course, that the foregoing disclosure relates to only preferred embodiments of the invention, and that it is intended to cover all changes and modifications of the examples of the invention herein chosen for the purpose of the disclosure which do not constitute departures from the spirit and scope of the invention set forth in the appended claims.

What is claimed and desired to be protected by Letters Patent of the United States is:

1. In a bearing arrangement for bottom rolls of a drafting mechanism, in combination, a support having a recess with an open top side; outer bearing ring means in said recess; a bottom roll having a portion substantially coaxial with said ring means and defining an annular bearing space therewith; said bottom roll being rotatable relative to said ring means about the common axis; antifriction elements in said bearing space interposed between said roll and said ring means for rolling contact therewith during rotation of said roll; an annular extension member axially projecting from said ring means and substantially coaxial therewith; a sealing member mounted on said roll and formed with an axially open annular recess movably receiving said extension member in sealing engagement; a cover member releasably engaging said support and extending over the open top side thereof; and securing means for securing said cover member to said ring means.

2. In a bearing arrangement as set forth in claim 1, said ring means being formed with a circumferential groove, and said securing means including a resilient member engaging said groove for axially securing said ring means.

3. In a bearing arrangement as set forth in claim 1, said ring means being formed with a radial opening therethrough, said securing means including a member mounted on said cover member and extending into said radial opening.

4. In a bearing arrangement for bottom rolls of a drafting mechanism, in combination, a support having a recess with an open top side; outer bearing ring means in said recess; a bottom roll having a portion substantially coaxial with said ring means and defining an annular bearing space therewith; said bottom roll being rotatable relative to said ring means about the common axis; antifriction elements in said bearing space interposed between said roll and said ring means for rolling contact therewith during rotation of said roll; an annular extension member axially projecting from said ring means and substantially coaxial therewith; a sealing member mounted on said roll and formed with an axially open annular recess movably receiving said extension member in sealing engagement; and a cover member having a portion releasably engaging said support and another portion secured to said ring means, said cover member conforming to said sealing member so as to define an annular narrow gap therewith.

5. In a bearing arrangement for bottom rolls of a drafting mechanism, in combination, a support; outer bearing ring means mounted on said support; a bottom roll having a portion substantially coaxial with said ring means and defining an annular bearing space therewith, said bottom roll being rotatable relative to said ring means about a common axis; antifriction elements in said bearing space interposed between said roll and said ring means for rolling contact therewith during rotation of said roll; a sleevelike extension member axially projecting from said ring means and substantially coaxially therewith, said extension member having a free end and terminating at said end into a substantially circular edge; an annular sealing member of U-shaped cross section and of yieldably resilient material, said sealing member being secured to said roll, for rotation therewith, adjacent said edge, the sealing member forming a substantially cylindrical recess opening toward said ring means, with the extension member being sandwiched between the legs of the U of the sealing member, the recess being shaped to sealingly receive the extension member.

6. In a bearing arrangement for bottom rolls of a drafting mechanism, in combination, a support; outer bearing ring means mounted on said support; a bottom roll having a portion substantially coaxial with said ring means and defining an annular bearing space therewith, said bottom roll being rotatable relative to said ring means about a common axis; antifriction elements in said bearing space interposed between said roll and said ring means for rolling contact therewith during rotation of said roll; a sleevelike extension member axially projecting from said ring means and substantially coaxially therewith, said extension member having a free end and terminating at said end into a substantially circular edge; at least a single radial annular projection on said extension member; an annular sealing member of U-shaped cross section and of yieldably resilient material, said sealing member being secured to said roll, for rotation therewith, adjacent said edge, the sealing member forming a substantially cylindrical recess opening toward said ring means, with the extension member being sandwiched between the legs of the U of the sealing member, said projection being in movable sealing engagement with the interior surface of the outer leg of said U.

References Cited in the file of this patent

UNITED STATES PATENTS

| 1,978,739 | Brittain | Oct. 30, 1934 |
| 2,592,718 | McGhee | Apr. 15, 1952 |
| 2,682,435 | Rein | June 29, 1954 |

FOREIGN PATENTS

| 160,376 | Sweden | Sept. 10, 1957 |